United States Patent Office 3,247,052
Patented Apr. 19, 1966

3,247,052
THIOCARBONYLDI(O,O-DIETHYL - PHOSPHONATE) IN AN INSECTICIDAL METHOD
Mervin E. Brokke, Richmond, and Donald G. Stoffey, Corte Madera, Calif., assignors to Stauffer Chemical Company, New York, N.Y., a corporation of Delaware
No Drawing. Filed Dec. 9, 1963, Ser. No. 329,282
1 Claim. (Cl. 167—22)

This invention relates to a certain organic phosphonate and its use as in biocidal compositions. In particular, it relates to the compound corresponding to the formula

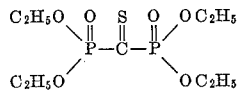

thiocarbonyldi(O,O - diethyl - phosphonate). The compound is valuable for its general insecticidal properties, as well as its systemic and miticidal properties.

The compound of the present invention can be made by the reaction of thiocarbonyl chloride and triethyl phosphite. The compound prepared by the aforedescribed reaction was tested as an insecticide and an acaricide according to the following methods.

*Acaricidal evaluation test.* — The two-spotted mite, *Tetranychus telarius* (Linn.) is employed in tests for acaricides. Young pinto bean plants are infested with several hundred mites. Dispersions of test compounds are prepared by dissolving 0.10 gram of the toxic material in ten milliliters of acetone. This solution is then diluted with water containing 0.0175% v./v. of Sponto®221, an emulsifying agent. The amount of water is sufficient to give concentrations of active ingredient ranging from 0.10% to 0.001%. The test suspensions are then sprayed on the infested pinto bean plants. After seven and fourteen days the plants are examined both for post-embryonic forms of the mite as well as for eggs. The percentage of kill is determined by comparison with control plants which have not been sprayed and the LD-50 value calculated using well known procedures. LD-50 values are reported under the column "2 SM," "Adults," "Nymphs" and "Eggs."

*Systemic toxicity evaluation against two-spotted Mites.*—Pinto bean plants in the primary leaf stage are placed in bottles containing 200 ml. of the test solution and held in place with cotton plugs. One plant per flask is used. Only the roots are immersed. This test evaluates the root absorption and upward translocation of the candidate systemic compound. The test solutions were prepared by dissolving the compound in 10 ml. of acetone. This solution was then diluted with distilled water, the amount of water being sufficient to give concentrations of active ingredient ranging from ten parts per million (p.p.m.) to 0.1 part per million. Immediately after the plants are placed in the test solutions they are infested with mites, *Tetranychus telarius* (Linn.).

After seven and fourteen days the plants are examined both for post-embryonic forms of the mite as well as for eggs. The percentage of kill is determined by comparison with control plants which have been placed in distilled water only. Again, the LD-50 value is calculated and reported under the column "2 SM Systemic" in the table.

*Insecticidal evaluation tests.*—Two insect species were subjected to evaluation tests for insecticides: (1) Housefly (HF) *Musca domestica* (Linn.) and (2) Spotted milkweed bug (MWB) *Oncopeltus fasciatus* (Dallas).

The procedure for the insects is similar to the miticidal testing precedure. Test insects are caged in cardboard mailing tubes with cellophane bottoms and course mesh nylon tops. Each cage is supplied with food and water. From ten to twenty-five insects are employed per cage. The caged insects are sprayed with the active candidate compound at various concentrations. Final mortality readings are taken after seventy-two hours.

Housefly evaluation tests differ in the following manner. The toxicant is dissolved in a volatile solvent, preferably acetone, the active compound is pipetted into a petri dish bottom, allowed to air dry and placed in a cardboard mailing tube. Twenty-five female flies, three to five days old, are caged in the tube. The flies are continuously exposed to the known residue of the active compound in the cage. Final mortality readings are taken forty-eight hours after initiation of the test. The LD-50 values are calculated using well known procedures.

TABLE

| Compound | HF, μg. | MWB, percent | 2 SM | | | |
|---|---|---|---|---|---|---|
| | | | Adults, percent | Nymphs, percent | Eggs, percent | Systemic, p.p.m. |
| Thiocarbonyl-di-(O,O-di-ethylphosphonate) | 30 | 0.08 | 0.003 | 0.003 | 0.08 | 0.3 |

The compounds of the present invention may be applied to a pest habitat in ways well known to those skilled in the art, such as dusts, sprays of solutions or dispersions and the like.

Various changes and modifications may be made without departing from the spirit and scope of the invention described herein as will be apparent to those skilled in the art to which it pertains. It is accordingly intended that the present invention shall only be limited by the scope of the appended claim.

We claim:
The method of killing insects comprising applying to an insect habitat an effective amount of thiocarbonyldi(O,O-diethyl-phosphonate).

No references cited.

JULIAN S. LEVITT, *Primary Examiner.*
VERA C. CLARKE, *Assistant Examiner.*